G. J. REUTER.
TIRE.
APPLICATION FILED APR. 14, 1915.

1,168,674.

Patented Jan. 18, 1916.

INVENTOR
George J. Reuter,
BY
Dyke+Camfield,
ATTORNEYS.

UNITED STATES PATENT OFFICE.

GEORGE J. REUTER, OF NEWARK, NEW JERSEY, ASSIGNOR, BY DIRECT AND MESNE ASSIGNMENTS, OF FIVE-TWELFTHS TO ABRAHAM M. HERMAN, OF WEST ORANGE, NEW JERSEY, AND THREE-TWELFTHS TO LOUIS R. FREUND, OF NEWARK, NEW JERSEY.

TIRE.

1,168,674.  Specification of Letters Patent.  Patented Jan. 18, 1916.

Application filed April 14, 1915. Serial No. 21,320.

*To all whom it may concern:*

Be it known that I, GEORGE J. REUTER, a citizen of the United States, and a resident of Newark, county of Essex, and State of New Jersey, have invented certain new and useful Improvements in Tires, of which the following is a specification.

My invention relates to improvements in tires, and particularly to automobile tire casings which receive an inflated inner tube.

Among the objects of the invention are to so construct and to reinforce the carcass or fabric containing portion of the tire casing as to make the tire puncture proof by effectively preventing the casing and the inner tube contained therein from being pierced by sharp objects such as nails and the like.

A further object of the invention is to so reinforce and strengthen the carcass of the tire as to distribute any localized strain throughout a considerable portion of the carcass, thus preventing fabric breakages and consequent blow-outs.

A further object of the invention consists in the provision of a construction whereby the advantages above referred to may be obtained without any considerable increase in the weight or thickness of the tire, and to provide a construction in which the exterior of the carcass and the rubber envelop or tread come directly together without any intervening part or parts between them, thus avoiding all tendency to separation of the rubber envelop or tread from the casing.

A further object of the invention consists in the provision of reinforcing members entirely embedded in rubber or composition containing rubber and provided with apertures through which the rubber may extend, forming rubber rivets extending through the apertures in the reinforces whereby they are securely and firmly held in position and vulcanized in the rubber in which they are embedded and are prevented from exerting any shifting, cutting or tearing action upon one another or neighboring elements of the tire.

Further objects of my invention will appear in connection with the further description thereof, and with the foregoing and related objects in view, my invention consists in the parts, improvements and combinations herein set forth and claimed.

Figure 1:
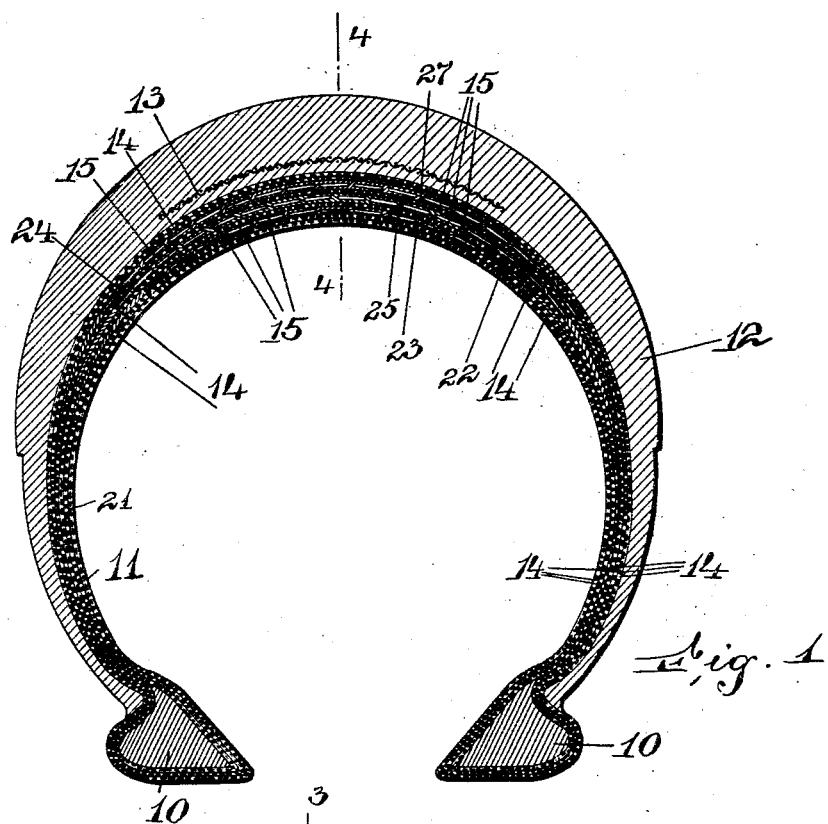
Figure 2:
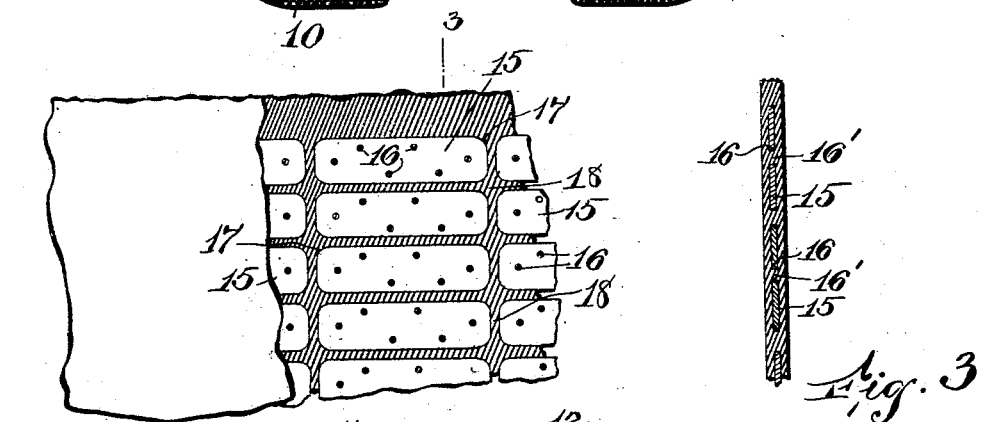
Figure 3:
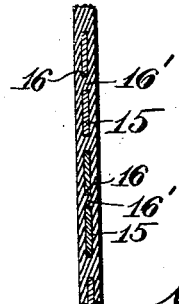
Figure 4:
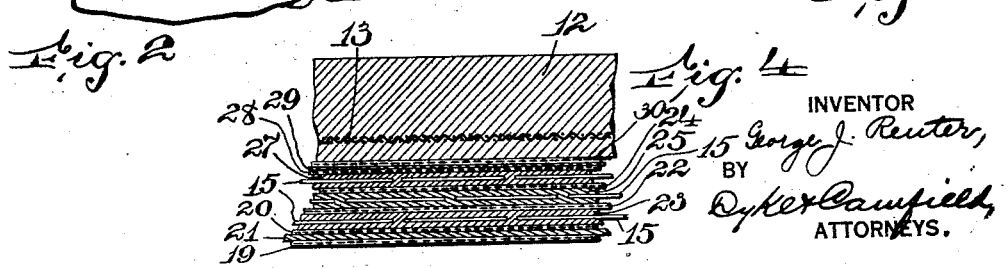

In the accompanying drawing forming a part of this specification, and wherein the same reference numerals are applied to designate the same parts uniformly throughout, Figure 1 is a cross-sectional view of a tire casing embodying my invention. Fig. 2 is a fragmentary cross-sectional view showing the preferred form, disposition and arrangement of the reinforcing members. Fig. 3 is an enlarged fragmentary cross-sectional view on the line 3, Fig. 2, and Fig. 4 is a vertical cross-sectional view on the line 4—4, Fig. 1.

In said drawing the tire to which the invention is shown as applied is of the clencher or detachable clencher form, having beads 10, 10. It may, however, be embodied in casings of different forms as, for example, the ordinary straight side tire casing.

The carcass or fabric containing portion of the tire is indicated generally at 11 and the rubber envelop or tread portion by 12. Such exterior rubber envelop making up the rubber side walls and tread portion may be of any convenient form and may be in one, two or more parts according to usual practice and preferably comprises the customary breaker strip 13.

The carcass 11, as is customary, comprises a number of alternate layers of textile material such as fabric and rubber, the precise number of such layers varying with the size of the tire, as is usual. In the drawing there are six such layers of fabric indicated by the reference numeral 14. According to the present invention, at the interior of the carcass, that is to say, between the innermost layers of fabric and in the neighborhood of the outer or domed portion of the tire, the layers of rubber or rubber composition interposed between the successive layers 11 of fabric are thickened somewhat, and there is embedded therein and vulcanized thereto a number of flexible, preferably metallic perforated reinforcing members as 15, which serve the function of armoring the tire, that is, preventing the passage of sharp objects therethrough, and also serve to reinforce and strengthen the carcass and to distribute any initially localized strain over a considerable space to thereby prevent fabric breakages and blow-outs. Such members 15 are preferably of thin, flexible, spring steel and are preferably several times as long as they are wide and provided with one or more transverse apertures 16 through which the rubber or rubber composition may extend to form rivets 16′ to securely anchor the reinforcing plates in place. Such reinforces 15 are preferably rounded somewhat at their corners, as indicated at 17, and are preferably arranged in the domed part of the tire between the inner layers of the carcass with a narrow space as 18 between them, thus permitting them to be firmly secured in place both by being surrounded by the rubber and having the rivets 16′ of the rubber extending therethrough. Such reinforces 15 are arranged with their longest dimension running the long way of the tire and are placed preferably between successive layers of fabric so as to break joints both longitudinally and transversely, as shown in Figs. 1 and 4, in such manner as that objects which may penetrate through one layer missing the reinforces 15 therein as by passing between two or more such reinforces will be effectually prevented from penetrating through the carcass to reach the inner tube by coming in contact with one or the other of the reinforces interposed between other layers of fabric in the tire carcass. Such reinforces being of thin, resilient material, and preferably of metal, and being much longer than wide afford a substantial reinforcement for the tire carcass while not interfering with the resiliency thereof, and serve very effectively to prevent sharp objects penetrating the casing and causing a puncture of the inner tube, and also serve very effectively to distribute over a very large area any localized strains which may be occasioned, for example, as by the tire striking curbstones, rocks and the like, and in this manner such local stresses and strains being distributed by means of the reinforcing plates which lap over one another both longitudinally and transversely, upon being transmitted to the inner surface of the tire and the inner tube therein, are no longer localized but spread out over a large extent, and thereby fabric breakages which may weaken the carcass and cause blow-outs are effectively prevented. Being of spring material and non-rigid the reinforcing plates bend readily with the other parts of the tire and rather add to its resiliency instead of detracting therefrom as is the case with rigid reinforces.

In the form shown with six layers of fabric, the inner layer 19 and the next to the inner layer of fabric 20 are arranged with the ordinary thin layer 21 of rubber between them, such as is provided in the building up of the carcass of any ordinary casing. Between the fabric layer 20 and the succeeding layer 22 there is a thickened layer of rubber 23 preferably tapered down at the sides of the tire, as clearly shown in the cross-sectional view, to substantially the same thickness as the layer 21, and in such layer 23 are embedded the reinforcing members 15 arranged, as already set forth, with their longer dimension lengthwise of the tire and their shorter dimension transverse thereof, and spaced a short distance from one another and preferably arranged in rows extending longitudinally and transversely of the tire, although they may be arranged in other relations. The reinforces 15 are preferably so treated and the composition in which they are embedded is so formed as that the reinforces 15 are strongly vulcanized to the composition in which they are embedded. This vulcanizing of the rubber or rubber composition to the metal, however, is carried out in accordance with well known practice and forms no part of the present invention. Next after the rubber layer 23 containing the reinforces 15 comes the layer of fabric 22 which is followed by a second layer of rubber 25 containing reinforces arranged in the same manner, as already described with reference to the layer 23, but with the reinforcing members breaking joints with the reinforces in said layer 23. After this layer of rubber and metal reinforces 25 comes another layer of fabric 24 and a succeeding layer of rubber 27 with metal reinforces again breaking joints with the last preceding layer, and finally a layer of fabric 28, the ordinary thin layer of rubber 29 and the layer of fabric 30. The number of layers of fabric and the number of layers of rubber containing reinforcing material may be varied, but preferably there are as many as three layers of rubber containing reinforcing material and at least one additional layer of fabric, the layers of rubber containing reinforcing material being preferably arranged between succeeding layers of fabric.

The reinforces 15 may be introduced into the layers, as 23 of rubber, in any convenient way. For example, they may be placed on one thin sheet or strip of rubber composition in proper position and a second sheet placed upon them when they have been put in place thereon and the strip thus made up used between layers of fabric in building up the carcass.

It will be seen that a carcass made up in the manner described will be altogether like an ordinary carcass on both its inner and outer surfaces, and that it does not differ from an ordinary carcass when completed in appearance, except that it is slightly thicker than the ordinary carcass at the domed part thereof, gradually tapering to either side.

The outer rubber envelop is applied directly to the exterior of the carcass as in the case of an ordinary casing or shoe and without anything being interposed therebetween and is vulcanized direct to the carcass and secured permanently thereto in the well known manner, so that there is no tendency to separation between the tread and carcass, as would be the case were reinforcing members or parts interposed between the carcass and the rubber envelop.

It will be seen that a tire casing constructed in accordance with my invention involves numerous features of advantage, that it may be readily constructed and without undue expense, and that the advantageous features of preventing punctures and distributing local strains are effected without any considerable increase in the weight of the tire and without introducing any features of construction, the presence of which would tend to cause separation of the tread from the tire carcass.

It is to be understood that the particular form shown is for the purpose of illustration only and that modifications therein and departures therefrom may be resorted to within the scope of my claims by which my invention is defined.

Having thus described my invention, I claim:

1. In a tire casing, a carcass forming the innermost portion and foundation of the casing, said carcass comprising a plurality of layers of fabric extending to the edges of the casing and a plurality of layers of rubber intermediate the layers of fabric with a layer of thin flexible substantially rectangular metallic plates embedded therein, said plates being apertured to permit the rubber to extend therethrough and the plates in separate layers breaking joints with one another, and an outer envelop comprising a tread portion secured directly to the carcass, substantially as set forth.

2. In a tire casing, a carcass forming the innermost portion and foundation of the casing, said carcass comprising a plurality of layers of fabric, layers of rubber therebetween and a layer of thin spring metallic plates in said rubber layers, said plates being spaced apart from one another and apertured, the rubber in which they are embedded passing through said apertures and between said plates, said plates being several times as long as they are wide and arranged with their lesser dimension transversely of the tire, and an outer rubber envelop comprising a tread portion secured directly to the carcass, substantially as set forth.

3. In a tire casing, a carcass making up the innermost portion of the casing and comprising a plurality of layers of fabric extending to the edges of the casing and layers of rubber therebetween, a plurality of said layers of rubber being thickened at the outer or tread portion and having separated metallic plates vulcanized therein, the plates being elongated longitudinally of the casing and being perforated and the rubber in which they are embedded extending through the perforations to form holding rivets, the carcass so made up being thickest at the tread portion and thinner at the sides and toward the edges, and an envelop comprising the tread of the tire vulcanized direct to said carcass, substantially as set forth.

In testimony that I claim the foregoing, I hereto set my hand, this 12th day of April, 1915.

GEORGE J. REUTER.